(12) United States Patent
Shelburne

(10) Patent No.: US 8,831,145 B2
(45) Date of Patent: Sep. 9, 2014

(54) HART TRANSMITTER/RECEIVER SYSTEMS

(75) Inventor: Thomas Ray Shelburne, Novi, MI (US)

(73) Assignee: Texas Instruments Incorporated, Dallas, TX (US)

( * ) Notice: Subject to any disclaimer, the term of this patent is extended or adjusted under 35 U.S.C. 154(b) by 582 days.

(21) Appl. No.: 13/110,807

(22) Filed: May 18, 2011

(65) Prior Publication Data

US 2011/0286542 A1     Nov. 24, 2011

Related U.S. Application Data

(60) Provisional application No. 61/345,843, filed on May 18, 2010.

(51) Int. Cl.
*H04L 27/12* (2006.01)
*H04L 27/156* (2006.01)
*H03D 3/00* (2006.01)

(52) U.S. Cl.
CPC .............. *H04L 27/12* (2013.01); *H04L 27/122* (2013.01)
USPC ............................ 375/334; 375/272; 375/303

(58) Field of Classification Search
CPC ..... H04L 27/122; H04L 27/12; H04L 27/156; H04L 27/14; H04L 27/10
USPC .......... 375/272, 303, 334, 222; 332/100, 101; 329/300
See application file for complete search history.

(56) References Cited

U.S. PATENT DOCUMENTS

| | | | | |
|---|---|---|---|---|
| 4,533,874 A | * | 8/1985 | Fischer | 329/303 |
| 5,382,924 A | * | 1/1995 | Pardoen et al. | 332/100 |
| 6,160,857 A | * | 12/2000 | Yang | 375/334 |
| 6,297,691 B1 | * | 10/2001 | Anderson et al. | 329/300 |
| 7,463,682 B2 | * | 12/2008 | Yang et al. | 375/272 |
| 2004/0113814 A1 | * | 6/2004 | Lochner | 340/870.18 |
| 2008/0253480 A1 | * | 10/2008 | Furman et al. | 375/303 |
| 2009/0168857 A1 | * | 7/2009 | Golborne et al. | 375/303 |
| 2011/0142173 A1 | * | 6/2011 | Peng et al. | 375/334 |

\* cited by examiner

*Primary Examiner* — Betsy Deppe
(74) *Attorney, Agent, or Firm* — Steven A. Shaw; Frederick J. Telecky, Jr.

(57) ABSTRACT

One embodiment of the present invention relates to a communications system. The system includes a Highway-Addressable Remote Transducer (HART) transmitter comprising a direct memory access (DMA) module configured to access at least one transmitter lookup table (LUT) using DMA transfers to modulate a HART data packet into a frequency-shift keying (FSK) data signal. The system also includes a HART receiver configured to demodulate a received FSK data signal into a demodulated HART data packet.

19 Claims, 5 Drawing Sheets

US 8,831,145 B2

HART TRANSMITTER/RECEIVER SYSTEMS

RELATED APPLICATIONS

The present invention claims priority from U.S. Provisional Patent Application No. 61/345,843, filed May 18, 2010.

TECHNICAL FIELD

The present invention relates generally to electronic circuits, and specifically to Highway-Addressable Remote Transducer (HART) transmitter/receiver systems.

BACKGROUND

The Highway-Addressable Remote Transducer (HART) communications protocol is an implementation of a half duplex digital industrial communication protocol. HART communication can be implemented, as an example, for real-time distributed control. HART communications can be implemented in two modes: peer-to-peer mode, in which analog and digital signals can be transmitted on a process current loop, and a multi-drop mode which implements digital communication only. For example, in the peer-to-peer mode, digital communication signals can be modulated onto a 4-20 milliamp (mA) analog current loop for communication between two HART devices.

SUMMARY

One embodiment of the present invention relates to a communications system. The system includes a Highway-Addressable Remote Transducer (HART) transmitter comprising a direct memory access (DMA) module configured to access at least one transmitter lookup table (LUT) using DMA transfers to modulate a HART data packet into a frequency-shift keying (FSK) data signal. The system also includes a HART receiver configured to demodulate a received FSK data signal into a demodulated HART data packet.

Another embodiment of the present invention includes a HART data transmitter system configured to modulate a HART data packet into a frequency-shift keying (FSK) data signal. The system includes a packet converter configured to convert each byte of a HART data packet into a data character and to access frequency-shift keying (FSK) phase information and amplitude information associated with each of a plurality of samples of the FSK data signal. The system also includes a data modulator configured to receive amplitude data associated with each of the plurality of samples of the FSK data signal based on the FSK phase from a lookup table (LUT) via a plurality of direct memory access (DMA) transfers at a sampling rate. The system further includes an analog stage configured to convert the amplitude data into the FSK data signal.

Another embodiment of the present invention includes data receiver system configured to demodulate a received FSK data signal into a HART data packet. The system includes a pulse detector configured to detect and measure pulse-widths of the FSK data signal. The system also includes a bit detector configured to compare the measured pulse-widths of the FSK data signal with digital state pattern data stored in a LUT to ascertain digital bits associated with the HART data packet. The system further includes a packetizer configured to assemble the HART data packet based on the digital bits.

Another embodiment of the present invention includes a method for communicating HART data. The method includes converting each byte of a HART data packet into a multi-bit data character. The method also includes accessing FSK phase information of each of a plurality of samples of each bit of an FSK data signal associated with the multi-bit data character from a first LUT. The method also includes storing the FSK phase information for each bit of the multi-bit data characters in a buffer and implementing a plurality of DMA transfers at a sampling rate to receive duty-cycle data associated with each of the plurality of samples of each bit of the FSK data signal from a second LUT based on the respective FSK phase information. The method further includes generating a PWM signal having a duty-cycle that is based on the duty-cycle data and integrating the PWM signal to generate the FSK data signal based on the duty-cycle of the PWM signal.

DETAILED DESCRIPTION

Figure 1:
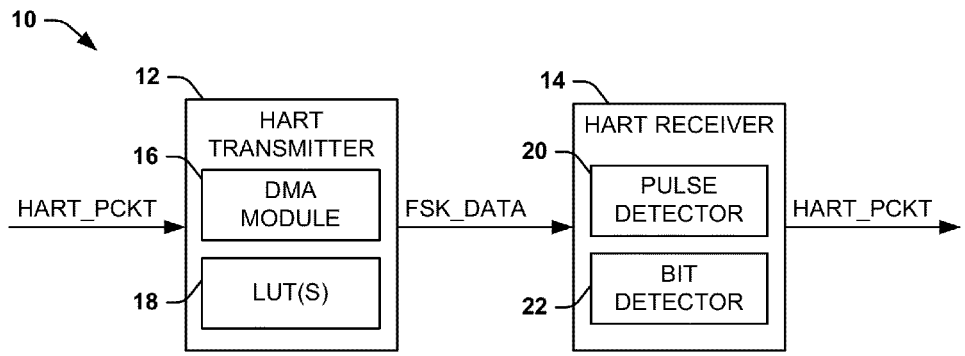
FIG. 1 illustrates an example of a communications system in accordance with an aspect of the invention.

The present invention relates generally to electronic circuits, and specifically to Highway-Addressable Remote Transducer (HART) transmitter/receiver systems. A HART communications system can include a HART transmitter and a HART receiver. The HART transmitter can include a packet converter that converts each byte of a HART data packet into a series of data characters, such as encoded in a manner similar to universal asynchronous receiver/transmitter (UART) characters that include a start bit, eight data bits, a parity bit, and a stop bit. The packet converter can access one or more lookup tables (LUTs) to ascertain phase information for a corresponding frequency-shift keying (FSK) data signal corresponding to the converted data characters. The phase information corresponding to each sample of a given bit of the data character can be saved in a data buffer. As an example, the packet converter can estimate a digital phase value in the LUT of a first sample of a bit of the FSK data signal having a first binary state (e.g., logic-high or logic-low) based on comparing a digital amplitude of the first sample of the bit with a digital amplitude of a last sample of an immediately preceding bit of the FSK data signal having an opposite binary state to maintain phase continuity of the FSK data signal.

The HART transmitter can include an FSK generator that generates the FSK data signal based on amplitude information that is received based on the phase information stored in the data buffer. An FSK generator can include a pulse-width modulation (PWM) module that can be configured to generate a PWM signal having a duty-cycle that is associated with digital amplitudes of each of the samples based on the phase information of the samples stored in the buffer. The PWM module can receive the digital amplitudes based on direct memory address (DMA) transfers from a LUT (e.g., separate from the phase information LUT). Thus, the duty-cycle of the fixed-frequency PWM signal can have a value that is related to the amplitude of the FSK data signal for each sample. The PWM signal can be provided to an analog stage, which could be configured as a filter/integrator stage to filter the PWM signal and to integrate the PWM signal to generate the FSK data signal. Thus, the FSK data signal can be transmitted to a HART receiver to transmit digital data. As an example, the FSK data signal can be modulated onto a process current loop signal, such as a 4-20 mA analog process loop signal.

The HART receiver can include a pulse detector that is configured to receive the FSK data signal and to detect and measure pulses contained therein. For example, the pulse detector can include a comparator to detect zero-crossings to convert the received FSK data signal into a pulsed digital output signal, and can include a pulse measurement component to measure the pulse lengths of the digital pulsed signal. The HART receiver can also include a bit detector configured to compare the pulse lengths with predetermined pulse length patterns stored in a LUT, such that the bit detector can determine the sequence of bits of a given data character within the FSK data signal. The data characters can then be converted into the corresponding bytes of the HART data packet, such that they can be packetized into the HART data packet.

FIG. 1 illustrates an example of a communications system 10 in accordance with an aspect of the invention. The communications system 10 is a communications system for transmitting HART data packets, demonstrated in the example of FIG. 1 as a signal HART_PCKT, from a HART transmitter 12 to a HART receiver 14 via an FSK data signal, demonstrated in the example of FIG. 1 as a signal FSK_DATA. As an example, the HART transmitter 12 can be located on microcontroller, such that the HART data packets HART_PCKT can be created via a local processor. As another example, the HART receiver 14 can be located on a device or circuit board that is separate from the HART transmitter 12.

As an example, the HART data packet HART_PCKT can include a plurality of bytes (e.g., approximately ten to more than two-hundred) and the FSK data signal FSK_DATA can include a sequence of data characters, such as eleven-bit UART data characters, that each correspond to a byte of the HART data packet HART_PCKT. Each bit of the FSK data signal FSK_DATA can have a frequency that corresponds to a specific logic-state of the respective bit. For example, the FSK data signal FSK_DATA can represent a logic-high state with a bit-period having a frequency of approximately 1200 Hz and a logic-low state with a bit-period having a frequency of approximately 2200 Hz and which is transmitted at approximately 1200 baud. For example, the FSK data signal FSK_DATA can be modulated onto an analog current signal, as described in greater detail herein.

The HART transmitter 12 includes a DMA module 16 and at least one LUT 18. As an example, the DMA module 16 can correspond to one or more hardware DMA channels resident on the microcontroller on which the HART transmitter 12 is configured. The HART transmitter 12 can thus be configured to access the LUT(s) 18 via the DMA module 16, such as by implementing DMA transfers via one or more DMA channels at a sampling rate to modulate the HART data packet HART_PCKT into the FSK data signal FSK_DATA. As an example, the LUT(s) 18 can include amplitude information regarding the FSK data signal FSK_DATA. The DMA transfers from the LUT(s) 18 can thus be hardware driven, such that they are performed substantially without any involvement by an associated processor. Therefore, by implementing DMA transfers from the LUT(s) 18 to receive amplitude information associated with the FSK data signal FSK_DATA at the sampling rate via the DMA module 16 instead of using processor interrupts at the sampling rate to generate the FSK data signal FSK_DATA, the HART transmitter 12 can substantially reduce processing load on the associated processor.

The HART receiver 14 includes a pulse detector 20 and a bit detector 22. The pulse detector 20 is configured to detect and measure pulse-widths of the FSK data signal FSK_DATA. For example, the pulse detector 20 can be configured to convert the FSK data signal FSK_DATA into a digital pulsed signal, such that the pulse detector 20 can measure a pulse-width of the digital pulses (e.g., on- and off-times) of the digital pulsed signal. Thus, the bit detector 22 can demodulate the received FSK data signal into the HART data packet HART_PCKT based on comparing the pulse-widths of the FSK data signal FSK_DATA with predetermined pulse-width pattern data, such as stored in one or more pattern matching LUT(s). For example, the pattern matching LUT(s) can include separate LUTs for each of a first bit and subsequent bits of a data character corresponding to each byte of the HART data packet HART_PCKT.

Figure 2:
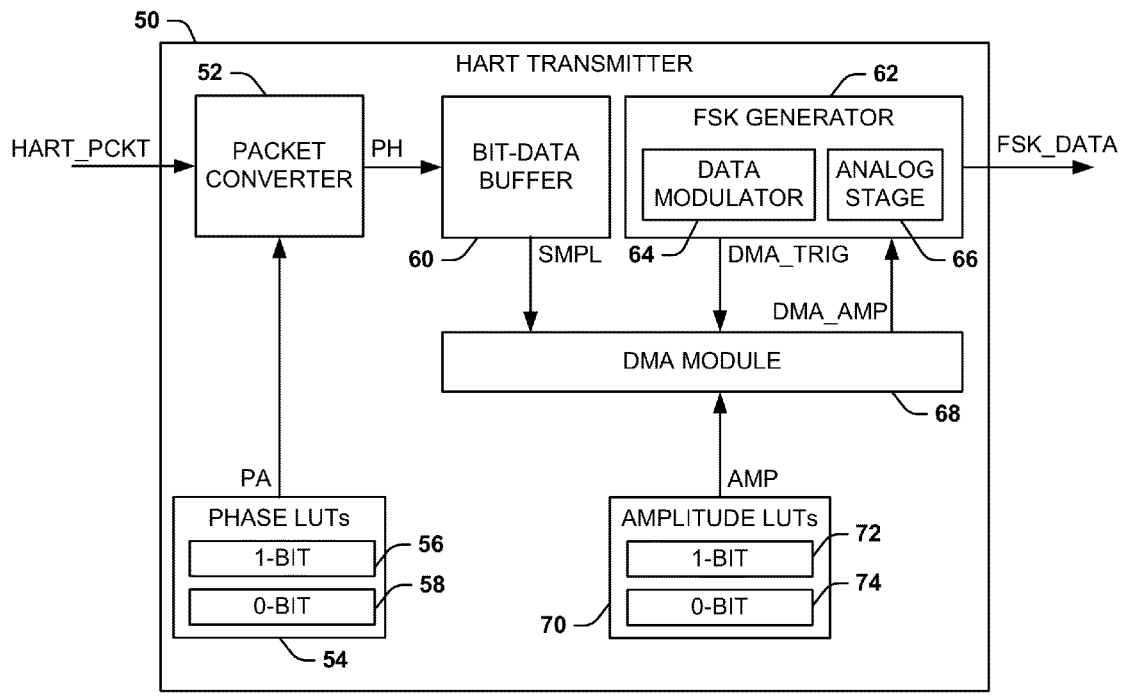
FIG. 2 illustrates an example of a Highway-Addressable Remote Transducer (HART) transmitter system in accordance with an aspect of the invention.

FIG. 2 illustrates an example of a HART transmitter system 50 in accordance with an aspect of the invention. The HART transmitter system 50 can be configured to convert a HART data packet HART_PCKT into an FSK data signal FSK_DATA. The HART transmitter system 50 can correspond to the HART transmitter 12 in the example of FIG. 1. Therefore, reference is to be made to the example of FIG. 1 in the following description of the example of FIG. 2. In addition, it is to be understood that the components and operation of the HART transmitter system 50, as described herein, can be based on implementation of a combination of hardware, firmware, and software.

The HART transmitter system 50 includes a packet converter 52 that receives the HART data packet HART_PCKT, such as from an associated local processor or memory (not shown). As an example, the packet converter 52 can be configured as one or more software routines to convert each byte of the HART data packet HART_PCKT into a multi-bit data character. For example, the data character can be configured as an eleven-bit data character that includes a start bit, eight data bits, a parity bit, and a stop bit. The packet converter 52 can also be configured to access a set of phase LUTs 54 to obtain phase and amplitude information associated with each of a plurality of samples of each bit of the data character. In the example of FIG. 2, the phase LUTs 54 include a separate 1-bit LUT 56 and a 0-bit LUT 58. The phase and amplitude information can thus be digital information that corresponds to characteristics of the analog FSK data signal FSK_DATA.

For example, the phase information that is accessed from the LUT 56 and 58 can correspond to digital indices that are associated with a phase of a given sample of the FSK data signal FSK_DATA. As an example, each of the LUTs 56 and 58 can include two bit-periods of digital indices/samples, such as 55 digital indices/samples for each bit-period of the respective 1200 Hz and 2200 Hz waveforms, that correspond to the analog FSK data signal FSK_DATA. Each digital index can thus include a corresponding digital amplitude value corresponding to the amplitude of the FSK data signal FSK_DATA at the phase corresponding to the respective digital index. The 1-bit LUT 56 can thus correspond to a binary state encoding of a logic-high (i.e., logic-1) bit of the data character that is converted by the packet converter 52. Similarly, the 0-bit LUT 58 can thus correspond to a binary state encoding of a logic-low (i.e., logic-0) bit of the data character that is converted by the packet converter 52.

The packet converter 52 can access the phase information (e.g., a digital index) and the amplitude information (i.e., digital amplitude value) from the respective one of the LUTs 56 and 58 corresponding to the binary state of the given bit of the data character. The packet converter 52 can then save the phase information for the sample in a bit-data buffer 60, demonstrated as via a signal PH. As an example, the bit-data buffer 60 can save the phase information for each sample of an entire bit of the data character at a given time.

The encoding of the FSK data signal FSK_DATA can be such bit-periods are phase continuous with respect to each other at bit transitions. As described above, a logic-high bit of the data character can be encoded as a 1200 Hz bit-period in the FSK data signal FSK_DATA and a logic-low bit of the data character can be encoded as a 2200 Hz bit-period in the FSK data signal FSK_DATA. Therefore, while each bit-period of the 1200 Hz bit-period is phase-aligned from one logic-high bit to another in the 1200-baud FSK data signal FSK_DATA with respect to the digital indices, the 2200 Hz bit-period of a logic-low bit is not phase-aligned to a consecutive logic-high bit at a bit transition in the FSK data signal FSK_DATA with respect to the digital indices. In other words, at a bit transition between a logic-high and a logic-low bit in the data character, the digital index corresponding to the phase information of the last sample of one bit may not correspond to a next contiguous digital index corresponding to the phase information of the first sample of the next bit of a logic transition of the sequence of bits in the data character.

Therefore, the packet converter 52 can be configured to maintain phase-continuity of the FSK data signal FSK_DATA at each logic bit transition within a given data character. As an example, the packet converter 52 can be further configured to estimate a digital index of a first sample of a bit at a logic transition by comparing the accessed digital amplitude value of the last sample of the immediately preceding bit with one of the 1-bit and 0-bit LUTs 56 and 58 with the range of digital amplitude values from the other of the 1-bit and 0-bit LUTs 56 and 58. For example, the packet converter 52 can start with the first digital index of the respective one of the 1-bit and 0-bit LUTs 56 and 58 and increment through the subsequent indices until determining the appropriate digital index based on the respective corresponding digital amplitude value.

Upon ascertaining an approximately equal digital amplitude value, the packet converter 52 can access that corresponding digital index for the first sample and can access the next contiguous digital indices (e.g., 54 additional indices) for the remaining samples of the bit-period. Because the phase LUTs 54 each include two bit-periods of digital indices, the phase LUTs 54 include enough data to access a bit-period of digital indices and corresponding digital amplitude values, regardless of which digital index the packet converter 52 access for a first sample of a given bit of the data character. Furthermore, to ensure proper phase-continuity, it is to be understood that the packet converter 52 can compare the digital amplitude values of the last two samples of a bit with two consecutive digital amplitude values in the phase LUTs 54 to ensure that the phase of the corresponding FSK data signal FSK_DATA is consistent at the bit transition.

The HART transmitter system 50 also includes an FSK generator 62 that includes a data modulator 64 and an analog stage 66. As an example, the data modulator 64 and the analog stage 66 can be configured as a set of one or more hardware components. For example, the data modulator and/or the analog stage 66 can be configured as a digital-to-analog converter (DAC) that is integral to the processor or is configured on an external device accessible via a serial or other connection from a processor. As another example, as described in greater detail below, the data modulator 64 and the analog stage 66 can be configured as a PWM module and filter/integrator, respectively. The data modulator 64 is configured to initiate DMA transfers from a DMA module 68 to receive amplitude data from a set of amplitude LUTs 70. As an example, the DMA module can correspond to one or more hardware DMA channels on an associated device that includes the HART data transmitter system 50. In the example of FIG. 2, the amplitude LUTs 70 include a separate 1-bit LUT 72 and a 0-bit LUT 74. Thus, each of the 1-bit and 0-bit LUTs 72 and 74 includes an amplitude value for each of a plurality of digital indices that correspond directly to the digital indices of the 1-bit and 0-bit LUTs 56 and 58 of the phase LUTs 54.

The data modulator 64 can thus invoke a plurality of DMA transfers, demonstrated as via respective signals DMA_TRIG, to receive amplitude data associated with each of a plurality of samples of each bit of the data character at a sampling rate (e.g., 66 kHz) based on the digital index corresponding to the given sample. As an example, the data modulator 64 can trigger a DMA transfer for a first sample of each bit-period based on a processor interrupt which can have a frequency of approximately 1200 Hz (e.g., once per bit-period of the FSK data signal FSK_DATA), such that the amplitude information for each subsequent sample can be received based solely on subsequent hardware-driven DMA transfers to complete transmission of the current bit, and not on subsequent processor interrupts until amplitude information associated with the samples of the next bit are to be transferred. Thus, the DMA module 66 can access the phase information for a starting sample and offsets for subsequent samples from the bit-data buffer 60, with the phase information being demonstrated as provided via the signal SMPL, and can access the corresponding amplitude data from the amplitude LUTs 70 based on the corresponding phase information. The amplitude data can therefore be provided to the data modulator 64, demonstrated in the example of FIG. 2 as via a signal DMA_AMP.

As an example, the data modulator 64 can be configured as a PWM module configured to access duty-cycle data from the amplitude LUTs 70. The data modulator 64 can thus generate a PWM signal that is a pulse-width modulated signal having a duty-cycle that is associated with the amplitude value of each sample of a given bit of the data character. The PWM signal can thus have a period corresponding to each of the samples (e.g., each of the 55 samples) of each given bit of the data character. Thus, each of the 1-bit and 0-bit LUTs 72 and 74 can include a duty-cycle value for each of a plurality of digital indices that correspond directly to the digital indices of the 1-bit and 0-bit LUTs 56 and 58 of the phase LUTs 54.

Figure 3:
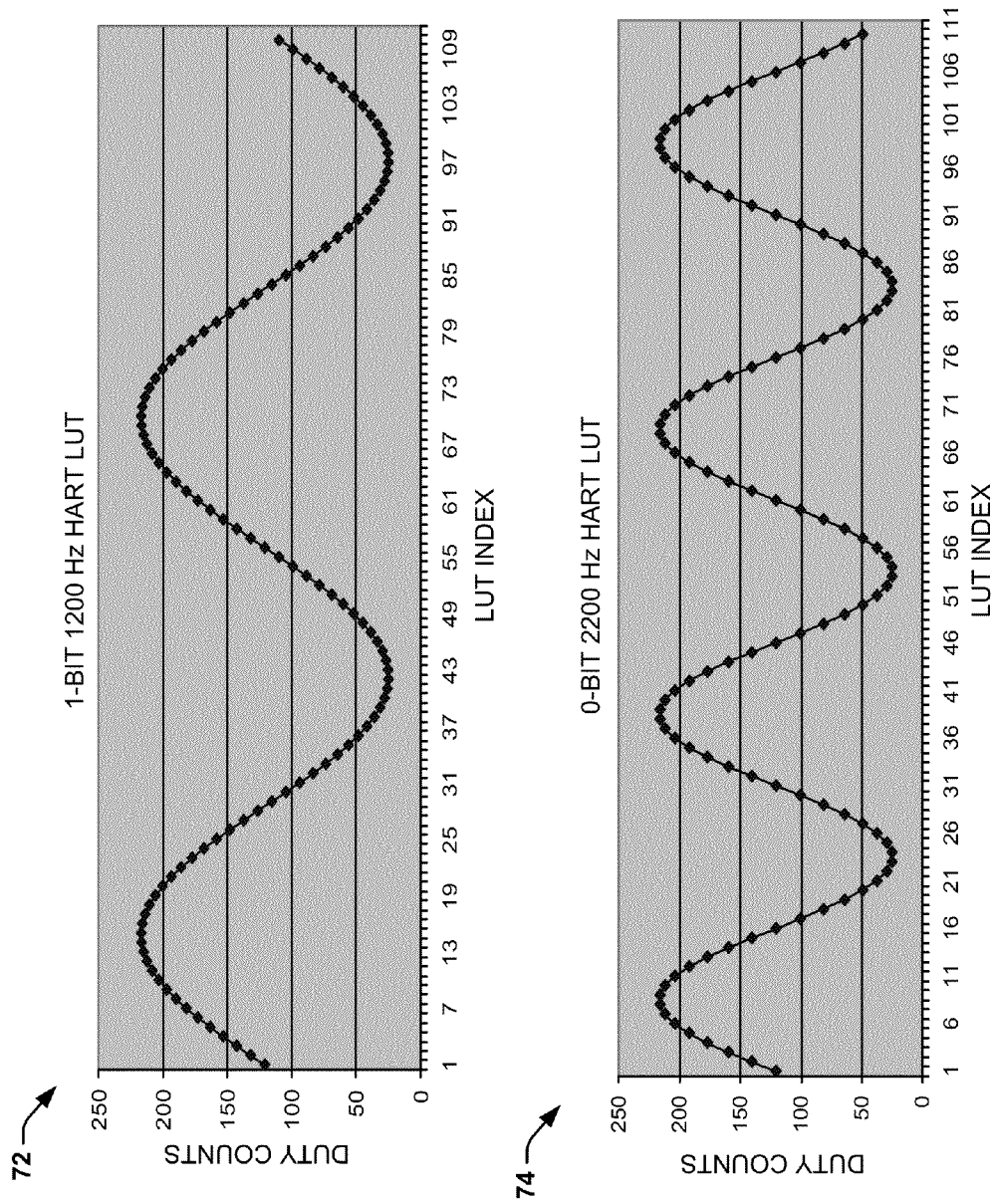
FIG. 3 illustrates an example of amplitude lookup tables in accordance with an aspect of the invention.

FIG. 3 illustrates an example of the amplitude LUTs 70 in accordance with an aspect of the invention. Specifically, in the example of FIG. 3, the amplitude LUTs 70 include the 1-bit LUT 72 and the 0-bit LUT 74. In the example of FIG. 3, the 1-bit LUT 72 includes two bit-periods of digital samples of a 1200 Hz waveform that corresponds to the analog FSK data signal FSK_DATA. The 1-bit LUT 72 can thus correspond to a binary state encoding of a logic-high (i.e., logic-1) bit of the data character that is converted into the FSK data signal FSK_DATA in the form of PWM duty counts. Similarly, the 0-bit LUT 74 includes two bit-periods of digital samples of a 2200 Hz waveform that corresponds to the analog FSK data signal FSK_DATA. The 0-bit LUT 60 can thus correspond to a binary state encoding of a logic-low (i.e., logic-0) bit of the data character that is converted into the FSK data signal FSK_DATA in the form of PWM duty counts.

In the example of FIG. 3, the amplitude LUTs 72 and 74 include digital indices of the two bit-periods of the respective data (e.g., 110 total digital indices). The LUTs 72 and 74 also include a digital amplitude values that correspond to a number of timer counts of a duty-cycle, demonstrated as DUTY COUNTS, ranging from 0 to 250. Thus, upon being initiated via the signal DMA_TRIG from the data modulator 64, the DMA module 68 can be configured to access the starting digital index of a first sample corresponding to a given bit and subsequent offsets (i.e., increments of digital indices) and provide them to the data modulator 64 as duty-cycle data in the form of duty counts that correspond to the digital amplitude of the FSK data signal FSK_DATA at a phase that corresponds to the respective digital index for each sample of the bit of the data character.

In the example of FIG. 3, the duty counts associated with a given sample vary between approximately 25 and 225 duty counts. Thus, the number of duty counts has a range between approximately 10% and 90% of the full duty-cycle range of duty counts. Therefore, errors in the generating the PWM signal associated with latency in providing the duty-cycle data to the data modulator 64 can be substantially mitigated with respect to each DMA transfer initiated by the signal DMA_TRIG and with respect to a processor interrupt that signals each bit period to reload the DMA channel without causing frequency domain glitches in the FSK data signal FSK_DATA.

Figure 4:
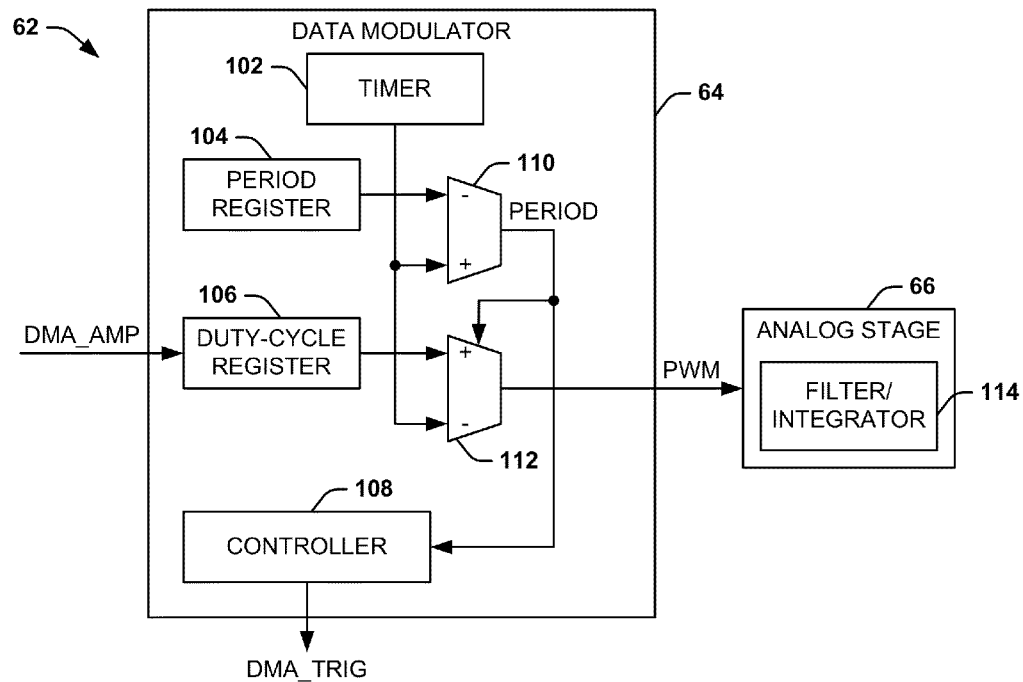
FIG. 4 illustrates an example of a frequency shift-keying (FSK) generator in accordance with an aspect of the invention.

FIG. 4 illustrates an example of the FSK generator 62 in accordance with an aspect of the invention. The FSK generator 62 includes both the data modulator 64 and the analog stage 66. In the example of FIG. 4, the data modulator 64 includes a timer 102, which can be, for example, a 16-bit timer. The data modulator 64 also includes a period register 104 and a duty-cycle register 106 providing PWM generation capability. The period register 104 can be a register that is pre-loaded with a timer value that corresponds to an amount of timer counts corresponding to a duration of the period of a PWM signal (e.g., 66 kHz). The duty-cycle register 106 is demonstrated as being loaded by the signal DMA_AMP. Therefore, the DMA module 68 can load the duty-cycle register 106 with a timing value corresponding to the duty-cycle data corresponding to the duty counts demonstrated in the example of FIG. 3 for that given sample, such as accessed by the DMA module 68 from the amplitude LUTs 70. Specifically, in the example of FIG. 4, a controller 108 can be configured to trigger each DMA transfer at the sample rate configured in period register 104 (e.g., 66 kHz) via the DMA trigger signal provided by the controller 108 to the DMA module 68. Thus, the DMA module 68 can access the duty-cycle data from the respective amplitude LUTs 70 for a given sample based on the digital index for that sample, such as received from the bit-data buffer 60 via the signal SMPL, at each of the DMA transfers. The DMA module 68 can thus write the duty-cycle data for the given sample into the duty-cycle register 106 for each period of the PWM signal.

The data modulator 64 also includes a first digital comparator 110 and a second digital comparator 112. The first digital comparator 110 is configured to compare the incrementing time value of the timer 102 with the predetermined timing value that is stored in the period register 104. Upon the incrementing time of the timer 102 being equal to the predetermined timing value stored in the period register 104, the first digital comparator 110 asserts an output PERIOD to signify that an entire period of the PWM signal has expired. The first digital comparator 110 thus provides output PERIOD to the controller 108 to trigger the loading of the next duty-cycle value into the duty-cycle register 106 via the signal DMA_TRIG. Because the duty counts of the amplitude LUTs 70 can range between approximately 10% of both the minimum and maximum duty counts, DMA latency or processor interrupt latency between periods cannot substantially affect the operation of the second digital comparator 112.

In addition, the output PERIOD resets the PWM signal of the second digital comparator 112, such that the PWM signal transitions from a logic-low output to a logic-high output at the beginning of each new PWM cycle. The second digital comparator 112 thus compares the incrementing time value of the timer 102 with the duty-cycle value that is loaded in the duty-cycle register 106. Upon the incrementing time of the timer 102 being equal to the duty-cycle value stored in the duty-cycle register 106, the second digital comparator 112 sets the PWM signal from a logic-high output to a logic-low output. Thus, the PWM signal has a duty-cycle that is set based on the duty counts corresponding to the phase information (i.e., the digital indices) of the samples of the data character.

The PWM signal is provided to the analog stage 66 that is configured to convert the PWM signal into the FSK data signal FSK_DATA. In the example of FIG. 4, the analog stage 66 includes a filter/integrator 114. As an example, the filter/integrator 114 can include a plurality of unity gain operational amplifiers (OP-AMPs) that are coupled via a low-pass filter (LPF). As an example, the LPF can be configured as a resistor/capacitor combination, such that the on-time of the PWM signal can be integrated onto the capacitor to convert the duty-cycle of the PWM signal into a corresponding magnitude of the FSK data signal FSK_DATA. The LPF of the filter/integrator 114 can thus also be configured to filter the high-frequency of the PWM signal corresponding to the DMA sampling rate (e.g., 66 kHz), resulting in a substantially smooth 1200 baud waveform of the FSK data signal FSK_DATA.

Referring back to the example of FIG. 2, based on the interaction of the data modulator 64 with the DMA module 68 to access the amplitude information from the amplitude LUTs 70, the HART transmitter system 50 can convert HART data packets HART_PCKT into the FSK data signal FSK_DATA without the use of processor interrupts at higher frequencies. Specifically, the HART transmitter system 50 implements hardware-driven DMA transfers at the sampling rate (e.g., 66 kHz) instead of processor interrupts at the sampling rate to modulate the FSK data signal FSK_DATA. As described above, the HART transmitter system 50 only receives processor interrupts at a frequency of approximately 1200 Hz, or approximately once for each bit-period of the 1200 baud FSK data signal FSK_DATA. As a result, the HART transmitter system 50 can operate with significantly lower processing overhead than would be required for implementing processor interrupts at the higher FSK sampling rate without DMA transfers.

Figure 5:
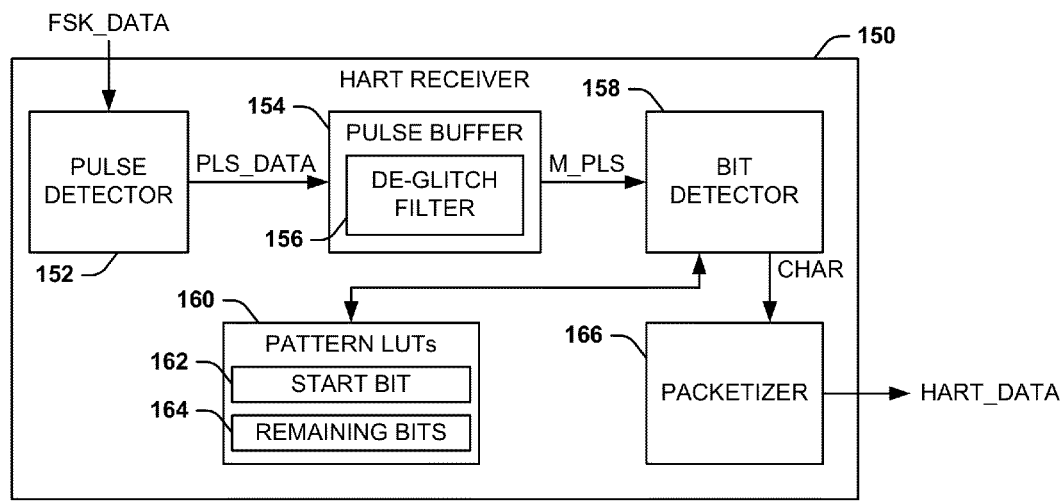
FIG. 5 illustrates an example of a HART receiver system in accordance with an aspect of the invention.

FIG. 5 illustrates an example of a HART receiver system 150 in accordance with an aspect of the invention. The HART receiver system 150 can be configured to demodulate the FSK data signal FSK_DATA back into the HART data packet HART_PCKT. The HART receiver system 150 can correspond to the HART receiver 14 in the example of FIG. 1. Therefore, reference is to be made to the example of FIG. 1 in the following description of the example of FIG. 5. In addition, it is to be understood that the components and operation of the HART receiver system 150, as described herein, can be based on implementation of a combination of hardware, firmware, and software.

The HART receiver system 150 includes a pulse detector 152 that receives the FSK data signal FSK_DATA. As an example, the FSK data signal FSK_DATA can be demodulated from an analog current signal, such as a 4-20 mA analog process loop signal. The pulse detector 152 is configured to convert the FSK data signal FSK_DATA into a digital pulsed signal representing zero-crossings. The digital pulsed signal can be a pulsed signal representation of the FSK data signal FSK_DATA, such that the pulses can have a frequency that approximately corresponds to the encoded frequency-shift keying of the FSK data signal FSK_DATA (e.g., 1200 Hz for a logic-high bit and 2200 Hz for a logic-low bit). The pulse detector 152 can also be configured to measure a pulse-width of both the on- and off-times of the digital pulsed signal and can provide the measurements as a signal PLS_DATA.

Figure 6:
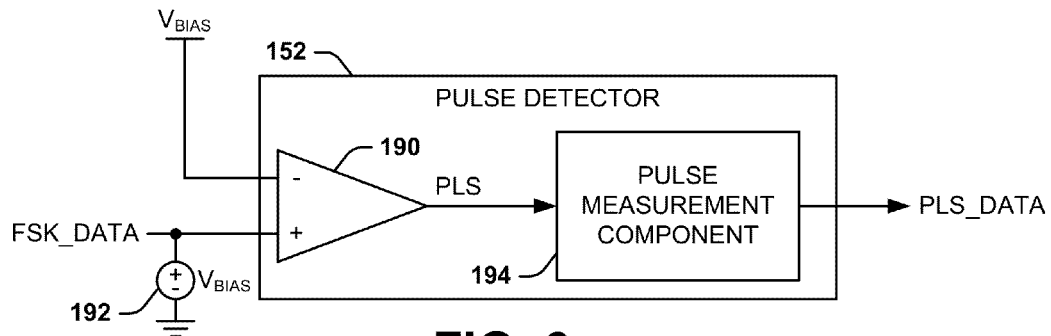
FIG. 6 illustrates an example of a pulse detector in accordance with an aspect of the invention.

FIG. 6 illustrates an example of the pulse detector 152 in accordance with an aspect of the invention. The pulse detector 152 includes an analog comparator 190 that receives the AC-coupled FSK data signal FSK_DATA at a non-inverting input and a DC bias voltage $V_{BIAS}$ at an inverting input, such that the comparator 190 is configured as a zero-crossing detector. As an example, the analog comparator 190 can be configured internally (e.g., within a processor) or can be configured on an external device. In the example of FIG. 6, the AC-coupled FSK data signal FSK_DATA is biased with the DC voltage $V_{BIAS}$, demonstrated as generated from a voltage source 192, such that the FSK data signal FSK_DATA can have a positive magnitude through the entirety of each period. As an example, the bias voltage $V_{BIAS}$ can have a magnitude that is approximately half of a positive voltage rail (not shown). Therefore, the comparator 190 can be configured to detect zero-crossings of the FSK data signal FSK_DATA to generate the digital pulsed signal PLS. It is to be understood that other circuit arrangements could be implemented in the pulse detector 152 for measuring zero-crossings to generate the digital pulsed signal PLS. In addition, it is to be understood that the comparator 190 can be configured to include hysteresis, such as to improve the quality of the digital output signal PLS of the analog comparator 190, for example, to reduce glitches and susceptibility to environmental noise.

The digital pulsed signal PLS is provided to a pulse measurement component 194. The pulse measurement component 194 is configured to measure the pulse widths of the on- and off-times of the digital pulsed signal PLS. In the example of FIG. 6, the pulse measurement component 194 is demonstrated as performing the measurements in response to processor interrupts, such as at a frequency that is approximately between two and four times a baud rate of the FSK data signal FSK_DATA (e.g., 4400 Hz). As an example, the pulse measurement component 194 can be configured as a capture/compare port that times edge-transitions of the digital pulsed signal PLS. For example, the pulse measurement component 194 can implement a 16-bit timer for the measurements of the pulse widths. Thus, the pulse measurement component 194 is configured to generate the signal PLS_DATA that comprises the pulse-width measurements.

Referring back to the example of FIG. 5, the pulse measurements indicated by PLS_DATA are stored in a pulse buffer 154 for background processing. The pulse buffer 154 is demonstrated in the example of FIG. 5 as including a de-glitch filter 156. The de-glitch filter 156 can be configured to filter out spurious pulses from the pulse-width measurements PLS_DATA, such as resulting from noise and/or ringing at the zero-crossing, such as due to lack of hysteresis. As an example, the de-glitch filter 156 can be configured as an algorithm that compares the pulse-widths to a predetermined pulse-width. The predetermined pulse-width can, for example, be a pulse-width that is substantially less than a pulse width corresponding to a 2200 Hz encoding of a logic-low bit. Upon determining that a given pulse is less than the predetermined pulse-width, the de-glitch filter 156 determines that the pulse is a glitch. In response, the de-glitch filter 156 eliminates the glitch pulse by adding the pulse-width of the glitch pulse to a preceding or subsequent pulse, thus preserving the time of a given period of the FSK data signal FSK_DATA. Furthermore, similar to as described above, the de-glitch filter 156 can be programmed to include hysteresis functionality with regard to the measured pulses of the digital pulsed signal PLS.

In addition, the de-glitch filter can further be configured to detect an overflow associated with the digital pulsed signal PLS. As an example, the de-glitch filter 156 can compare the pulse-widths of the digital pulsed signal PLS to a predetermined pulse-width that is substantially greater than a pulse width corresponding to a 1200 Hz encoding of a logic-high bit. Such a large pulse-width can thus correspond to an overflow condition. In response, the de-glitch filter 156 can be configured to change the measured pulse-width of the respective digital pulse to a unique value that could not otherwise correspond to a valid pulse-width measurement. For example, the de-glitch filter 156 could change the pulse-width value to zero or a standard value that is greater than a valid maximum.

The HART receiver system 150 also includes a bit detector 158 that is configured to determine the bits of each data character that is encoded as the FSK data signal FSK_DATA based on the pulse-widths of the pulsed digital signal PLS. The bit detector 158 thus accesses the pulse buffer 154 to obtain the de-glitched pulse-width measurements, demonstrated in the example of FIG. 5 as a signal M_PLS. The bit-detector 158 can thus compare the measured de-glitched pulse-widths of the digital pulsed signal PLS with predetermined bit pattern data to determine if a sequence of pulses corresponds to a logic-high bit or a logic-low bit of the respective data character. As an example, based on the frequency difference between the encoded pulses of the logic-high and logic-low bits of the data character (e.g., 1200 Hz and 2200 Hz, respectively), the pulse-widths can correspond to portions of a logic-high bit, a logic-low bit, or a pulse that has a pulse-width that is between a logic-high and a logic-low bit, such as resulting from a transition between a logic-high and a logic-low bit.

The HART receiver system 150 includes a set of pattern LUTs 160 from which the bit detector 158 can access the bit pattern data. In the example of FIG. 5, the pattern LUTs 160 include a start bit LUT 162 and a remaining bits LUT 164. For example, the bit detector 158 can compare a given set of pulse-widths with the bit pattern data in the start bit LUT 162 to determine both a logic-state and phase of the first bit of a data character that is encoded in the FSK data signal FSK_DATA. Upon determining the logic-state and phase of the first bit of the data character, the bit detector 158 can estimate the phases of the remaining bits of the data character to receive the remainder of the data character reliably and accurately. For example, the bit detector 158 can compare subsequent sets of pulse-widths with bit pattern data in the remaining bits LUT 164 to determine the remaining sequence of bits in the data character. As an example, the remaining bits LUT 164 can include bit pattern data that is associated with both pulse widths and a logic state of a preceding bit in the sequence of bits of the data character. Therefore, based on the bit pattern data in the pattern LUTs 160, the bit detector 158 can determine the sequence of bits in each data character of the FSK data signal FSK_DATA. The bit detector 158 can thus reassemble the data characters corresponding to the bytes of the HART data packet HART_PCKT.

In addition, upon determining a stream of bits corresponding to a complete data character corresponding to a byte of the HART data packet HART_PCKT, the bit detector 158 can be configured to perform parity tests on the 11-bit data characters to determine whether the data appears to be valid. Furthermore, the bit detector 158 can determine if an overflow condition has occurred based on the measured pulse-widths M-PLS. As described above, the de-glitch filter 156 can change the measured pulse-width of the respective digital pulse and insert a unique value (e.g. 0xFFFF) that could not otherwise correspond to a valid pulse-width measurement into the pulse buffer 154 to signal this condition has occurred to the bit detector 158. Thus, upon the bit detector 158 determining that a given one of the measured pulses M-PLS has this unique value, the bit detector 158 can indicate the occurrence of an overflow condition. In response, the bit detector 158 can act accordingly. For example, the bit detector 158 can facilitate a reset of relevant state machines, such as to correct the error conditions that caused the overflow condition.

The data characters with proper parity, demonstrated in the example of FIG. 5 as a signal CHAR, can be provided to a packetizer 166. The packetizer 166 can be configured to convert each of the data characters into each respective byte of the HART data packet HART_PCKT. For example, the packetizer 166 can remove a start bit, a stop bit, and a parity bit from each of the data characters to extract each respective byte of the HART data packet HART_PCKT. Thus, the packetizer 166 can rebuild the HART data packet HART_PCKT based on each of the bytes corresponding to each data character from the demodulated FSK data signal FSK_DATA. Accordingly, the HART receiver system 150 can demodulate the FSK data signal FSK_DATA to generate HART data packets HART_PCKT. The HART data packets HART_PCKT can then be processed, such as by a local processor, or can be transmitted to one or more other devices for further processing.

Figure 7:
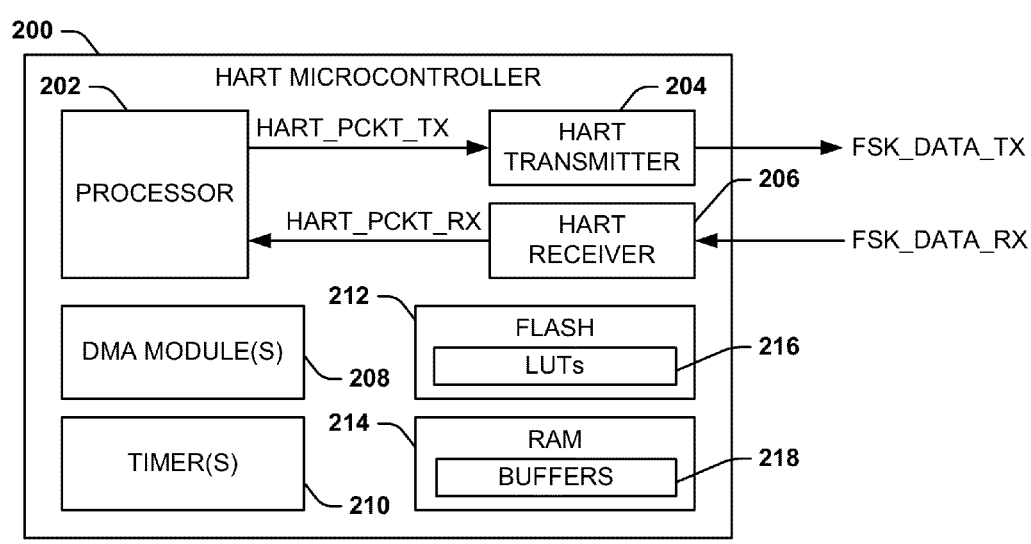
FIG. 7 illustrates an example of a HART microcontroller in accordance with an aspect of the invention.

FIG. 7 illustrates an example of a HART microcontroller 200 in accordance with an aspect of the invention. The HART microcontroller 200 can be configured as any of a variety of microcontroller devices, such as a Texas Instruments MSP430 HART modem microcontroller. The HART microcontroller 200 can be configured as a communications modem to transmit and receive an FSK data signal FSK_DATA that comprises modulated HART data packets HART_PCKT.

The HART microcontroller 200 includes a processor 202, a HART transmitter 204, and a HART receiver 206. However, it is to be understood that the HART microcontroller 200 could instead include only a single one of the HART transmitter 204 and the HART receiver 206. In the example of FIG. 7, the processor 202 is configured to generate HART data packets HART_PCKT_TX that are provided to the HART transmitter 204. As an example, the HART transmitter 204 can be configured substantially similar to the HART transmitter system 50 in the example of FIG. 2. Therefore, the HART transmitter 204 can be configured to modulate the HART data packets HART_PCKT_TX into an FSK data signal FSK_DATA_TX that is transmitted from the HART microcontroller 200, such as to an external device. For example, the FSK data signal FSK_DATA_TX can be modulated onto an analog control signal. Similarly, the HART receiver 206 can be configured substantially similar to the HART receiver system 150 in the example of FIG. 5. Thus, the HART microcontroller 200 can be configured to receive an FSK data signal FSK_DATA_RX, such as from an external device. The FSK data signal FSK_DATA_RX can therefore be demodulated by the HART receiver 206 to rebuild HART data packets HART_PCKT_RX, such as generated from a processor at the external device. The HART data packets HART_PCKT_RX can thus be processed by the processor 202.

As described above, the HART transmitter and receiver 204 and 206 can be configured substantially similar to the HART transmitter and receiver systems 50 and 150 in the examples of FIGS. 2 and 5, respectively. However, it is to be understood that one or more of the components of the HART transmitter and receiver systems 50 and 150 demonstrated in the examples of FIGS. 2 and 5, as well as the components therein demonstrated in the examples of FIGS. 3, 4, and 6, can be distributed on the HART microcontroller 200. Specifically, in the example of FIG. 7, the HART microcontroller 200 also includes one or more DMA modules 208, one or more timers 210, a flash memory 212, and a random access memory (RAM) 214.

One or more of the DMA module(s) 208 can correspond to the DMA module 68 in the example of FIG. 2, such that the HART transmitter 204 can be configured to implement DMA transfers via the DMA module(s) 208. The timer(s) 210 can correspond to the timer 102 in the example of FIG. 4, such that the timer(s) 210 can be implemented in a PWM controller associated with the HART transmitter 204. In addition, the timer(s) 210 can include one or more additional timers, such as for generating processor interrupt signals and/or for measuring the pulse-widths of the digital pulsed signals PLS generated by the pulse detector 152.

In the example of FIG. 7, the flash memory 212 includes a plurality of LUTs 216. As an example, the LUTs 216 can correspond to one or more of the phase LUTs 54, the amplitude LUTs 70, and the pattern LUTs 160 in the examples of FIGS. 2 and 5, respectively. Furthermore, in the example of FIG. 7, the RAM 214 includes a plurality of buffers 218. As an example, the buffers 218 can correspond to one or more of the bit-data buffer 60 and the pulse buffer 154 in the examples of FIGS. 2 and 5, respectively. Therefore, the HART microcontroller 200 can be a self-contained device, such as an application specific integrated circuit (ASIC), that can both transmit and receive FSK data signals in a much more processor efficient manner, as described herein.

Figure 8:
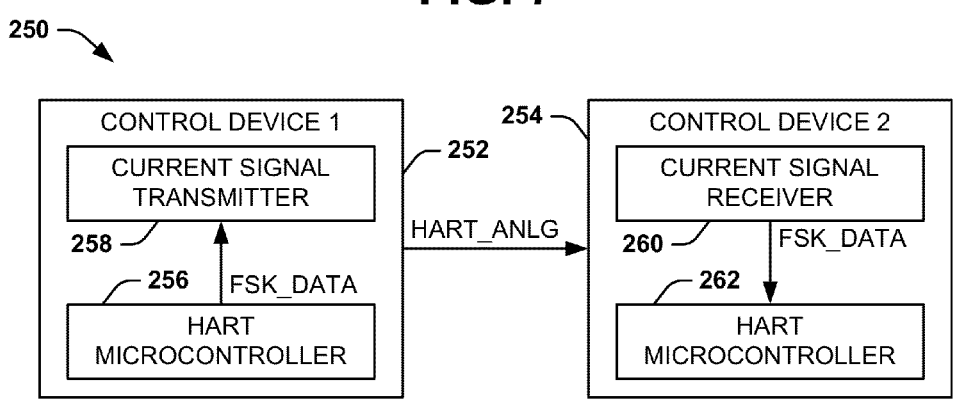
FIG. 8 illustrates an example of a control system in accordance with an aspect of the invention.

FIG. 8 illustrates an example of a control system 250 in accordance with an aspect of the invention. The control system 250 can be configured as any of a variety of industrial and/or control applications that include the transmission of digital data on an analog control signal. The control system 250 includes a first control device 252 and a second control device 254. The first and second control devices 252 and 254 can be configured as any of a variety of electronic devices. As an example, the first control device 252 can be configured as an I/O control device, such as to provide digital control signals and possibly also analog control signals to the second control device 254, which could be configured as an active real-time control device (e.g., a motor controller, a servo controller, a valve, etc.). As another example, the first control device can be configured as a process sensor (e.g., a flow meter, a temperature sensor, a position sensor, etc.), such as to provide digital indication signals and possibly also analog indication signals to the second control device 254, which could be configured as an I/O device.

In the example of FIG. 8, the first control device 252 includes a first HART microcontroller 256 and a current signal transmitter 258. As an example, the first HART microcontroller 256 can be configured substantially similar to the HART microcontroller 200 in the example of FIG. 7. Alternatively, the first HART microcontroller 256 could include only a HART transmitter, such as similar to the HART transmitter system 50 in the example of FIG. 2. The first HART microcontroller 256 is configured to generate an FSK data signal FSK_DATA, such as based on modulating HART data packets, such as described above regarding the example of FIGS. 2-4. The current signal transmitter 258 is configured to generate an analog control current. For example, the analog control current could be a 4-20 mA analog control current. As another example, the analog control current could be a fixed 4 mA analog current. The current signal transmitter 258 is also configured to modulate the FSK data signal FSK_DATA onto the analog control current to generate an analog signal HART_ANLG on which the FSK data signal FSK_DATA is modulated.

The second control device 254 includes a current signal receiver 260 and a second HART microcontroller 262. The current signal receiver 260 is configured to receive and demodulate the analog signal HART_ANLG, such that the FSK data signal FSK_DATA is separated from the analog control current. The second control device 254 can thus perform a function and/or process the analog control current in any of a variety of ways or for any of a variety of purposes.

The second HART microcontroller 262 can be configured substantially similar to the HART microcontroller 200 in the example of FIG. 7. Alternatively, the second HART microcontroller 262 could include only a HART receiver, such as similar to the HART receiver system 150 in the example of FIG. 5. The second HART microcontroller 262 is thus configured to demodulate the FSK data signal FSK_DATA to rebuild the HART data packets that are provided to the first HART microcontroller 258, such as described above regarding the examples of FIGS. 5 and 6. The HART data packets can thus be processed by a processor in the second control device 254, and/or can be retransmitted for further processing.

Figure 9:
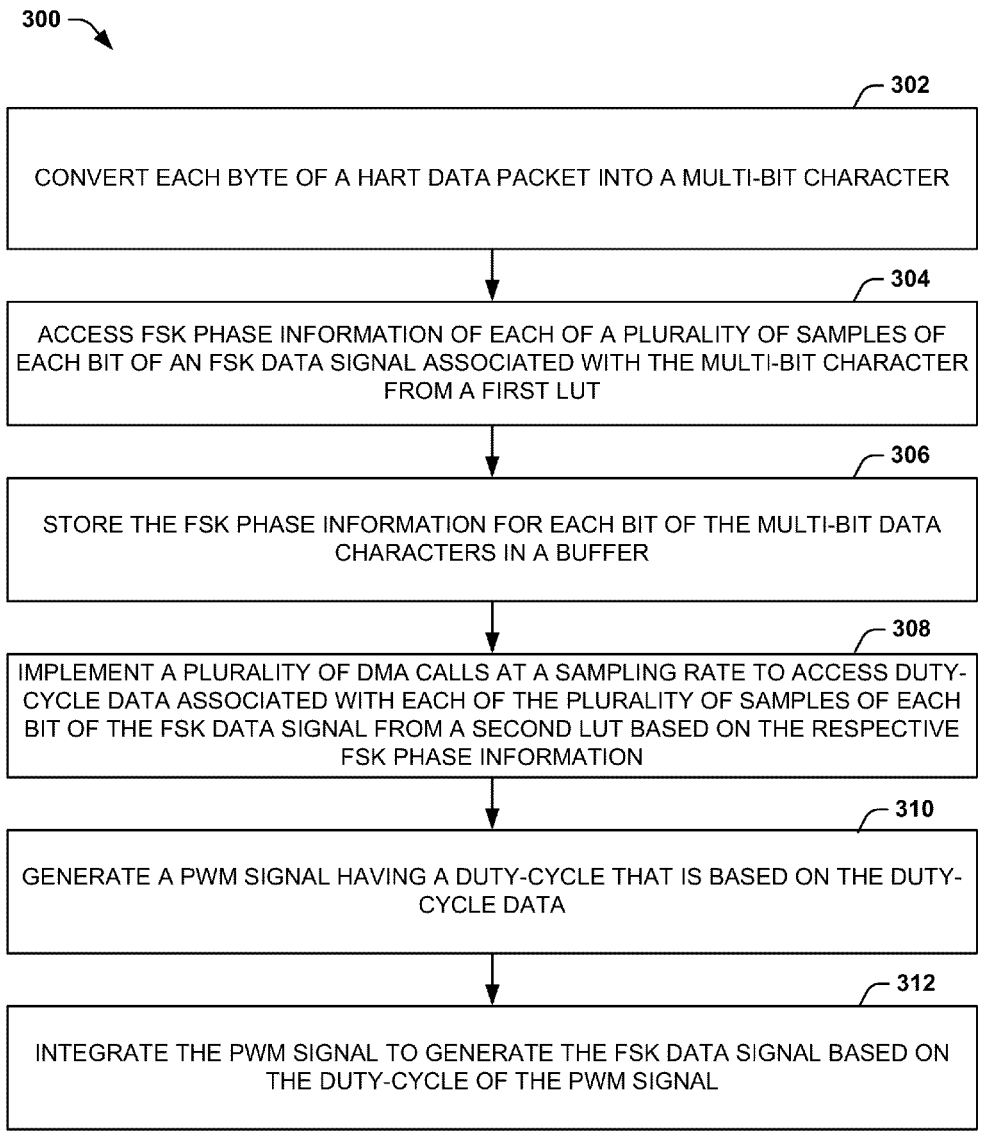
FIG. 9 illustrates an example of a method for communicating Highway-Addressable Remote Transducer (HART) data.

In view of the foregoing structural and functional features described above, certain methods will be better appreciated with reference to FIG. 9. It is to be understood and appreciated that the illustrated actions, in other embodiments, may occur in different orders and/or concurrently with other actions. Moreover, not all illustrated features may be required to implement a method.

FIG. 9 illustrates an example of a method 300 for communicating HART data. At 302, each byte of a HART data packet is converted into a multi-bit data character. As an example, the multi-bit character can be an eleven-bit UART character that includes a start bit, a stop bit, a parity bit, and eight data bits. At 304, FSK phase information of each of a plurality of samples of each bit of an FSK data signal associated with the multi-bit data character are accessed from a first LUT. At 306, the FSK phase information is stored for each bit of the multi-bit data characters in a buffer. The buffer can store all of the phase for every sample for an entire bit.

At 308, a plurality of DMA transfers are implemented at a sampling rate to receive duty-cycle data associated with each of the plurality of samples of each bit of the FSK data signal from a second LUT based on the respective FSK phase information. The duty-cycle data can be accessed based on digital indices that correspond to the phase information for each sample. At 310, a PWM signal having a duty-cycle that is based on the duty-cycle data is generated. The PWM signal can be generated based on a timer incrementing to a timing value that is set in a register via the DMA transfers. At 312, the PWM signal is integrated to generate the FSK data signal based on the duty-cycle of the PWM signal. The integration can be based on building charge with the on-time of the PWM signal on a capacitor that is part of an RC low-pass filter.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A communications system comprising:
   a Highway-Addressable Remote Transducer (HART) transmitter comprising a direct memory access (DMA) module configured to access at least one transmitter lookup table (LUT) using a plurality of DMA transfers to modulate a HART data packet into a frequency-shift keying (FSK) data signal;
   a HART receiver configured to demodulate a received FSK data signal into a demodulated HART data packet, the HART receiver comprising:
      a pulse detector configured to detect and measure pulse-widths of the received FSK data signal; and
      a bit detector configured to demodulate the received FSK data signal into a demodulated HART data packet based on comparing the pulse-widths of the received FSK data signal with predetermined pulse-width data contained within at least one receiver LUT.

2. The system of claim 1, wherein the at least one receiver LUT comprises a first LUT associated with detecting a logic-state and estimating a phase of a starting bit of a data character associated with the demodulated HART data packet and a second LUT associated with each of a plurality of remaining bits of the data character associated with the demodulated HART data packet.

3. The system of claim 1, wherein the pulse detector comprises:
   a comparator configured to convert the received FSK data signal into a digital pulsed signal; and
   a pulse measurement component configured to measure on- and off-times of the digital pulsed signal.

4. The system of claim 3, wherein the pulse measurement component is configured to perform the measurement of the on- and off-times of the digital pulsed signal based on processor interrupts at a frequency that is between three and four times a baud rate of the received FSK data signal.

5. The system of claim 3, wherein the bit detector is configured to compare the on- and off-times of the digital pulsed signal with digital state pattern data stored in the at least one receiver LUT to ascertain digital bits associated with the demodulated HART data packet.

6. A microcontroller comprising:
   a Highway-Addressable Remote Transducer (HART) transmitter comprising a direct memory access (DMA) module configured to access at least one transmitter lookup table (LUT) using a plurality of DMA transfers to modulate a HART data packet into a frequency-shift keying (FSK) data signal;
   a HART receiver configured to demodulate a received FSK data signal into a demodulated HART data packet;
   a processor;
   a flash memory comprising the at least one transmitter LUT and at least one receiver LUT;

a random access memory (RAM) comprising at least one data buffer associated with at least one of the HART transmitter and the HART receiver; and at least one timer configured to enable the processor to generate processor interrupts at a frequency that is approximately equal to a lowest frequency of the FSK data signal.

7. A Highway-Addressable Remote Transducer (HART) data receiver system configured to demodulate a received frequency-shift keying (FSK) data signal into a HART data packet, the system comprising:

a pulse detector configured to detect and measure pulse-widths of the FSK data signal;

a bit detector configured to compare the measured pulse-widths of the FSK data signal with digital state pattern data stored in a lookup table (LUT) to ascertain digital bits associated with the HART data packet; and a packetizer configured to assemble the HART data packet based on the digital bits.

8. The system of claim 7, wherein the pulse detector comprises:

a comparator configured to convert the FSK data signal into a digital pulsed signal comprising digital pulses having alternating logic-high and logic-low states; and a pulse measurement component configured to measure the pulse-width of each of the digital pulses.

9. The system of claim 8, wherein the pulse measurement component is configured to perform the measurement of the pulse-width of each of the digital pulses based on processor interrupts at a frequency that is between three and four times a baud rate of the FSK data signal.

10. The system of claim 8, wherein the bit detector is configured to compare the width of each of the digital pulses with digital state pattern data stored in the LUT to ascertain the digital bits associated with the demodulated HART data packet.

11. The system of claim 8, further comprising a de-glitch filter configured to compare the width of each of the digital pulses with a predetermined pulse-width and to remove a given one of the digital pulses and adding a width of the given one of the digital pulses to a previous one of the digital pulses upon the width of the given one of the digital pulses being less than the predetermined pulse-width.

12. The system of claim 11, wherein the de-glitch filter is further configured to detect an invalid pulse-width measurement associated a given digital pulse and to change the invalid pulse-width measurement into a unique pulse-width value, the bit detector being configured to indicate an overflow event associated with the HART data receiver system in response to the unique pulse-width value.

13. The system of claim 7, wherein the FSK data signal comprises a plurality of consecutive data characters, each of the plurality of consecutive data characters being associated with a byte of the HART data packet, the bit detector being configured to ascertain a plurality of bits associated with each of the plurality of consecutive data characters.

14. The system of claim 13, wherein the receiver LUT comprises a first LUT associated with a logic-state and a phase of a starting bit of each of the plurality of consecutive data characters and a second LUT associated with each of a plurality of remaining bits of each of the plurality of consecutive data characters.

15. A method for communicating Highway-Addressable Remote Transducer (HART) data, the method comprising:

converting each byte of a HART data packet into a multi-bit data character;

accessing frequency-shift keying (FSK) phase information of each of a plurality of samples of each bit of an FSK data signal associated with the multi-bit data character from a first lookup table (LUT);

storing the FSK phase information for each bit of the multi-bit data characters in a buffer;

implementing a plurality of DMA transfers at a sampling rate to receive duty-cycle data associated with each of the plurality of samples of each bit of the FSK data signal from a second LUT based on the respective FSK phase information;

generating a PWM signal having a duty-cycle that is based on the duty-cycle data; and integrating the PWM signal to generate the FSK data signal based on the duty-cycle of the PWM signal.

16. The method of claim 15, wherein implementing the plurality of DMA transfers from the second LUT comprises initiating the plurality of DMA transfers based on a processor interrupt, the processor interrupt having a frequency that is approximately equal to a lowest frequency of the FSK data signal.

17. The method of claim 15, further comprising modulating the FSK data signal onto an analog process loop signal.

18. The method of claim 15, further comprising:

receiving the FSK data signal at a receiver;

converting the received FSK data signal into a digital pulsed signal comprising digital pulses having alternating logic-high and logic-low states;

measuring a pulse-width of each of the digital pulses;

comparing the measured pulse-widths of each of the digital pulses with digital state pattern data stored in a receiver LUT;

ascertaining digital bits associated with each of the plurality of multi-bit data characters associated with the HART data packet; and assembling the HART data packet from the plurality of multi-bit data characters.

19. The method of claim 18, wherein measuring the pulse-width of each of the digital pulses comprises measuring the pulse-width of each of the digital pulses based on processor interrupts at a frequency that is between three and four times a baud rate of the FSK data signal.

* * * * *